July 17, 1962     MASAO SUGASAWA     3,044,541
CONTINUOUS DIGESTING AND EXTRACTING APPARATUS
Filed Feb. 29, 1960
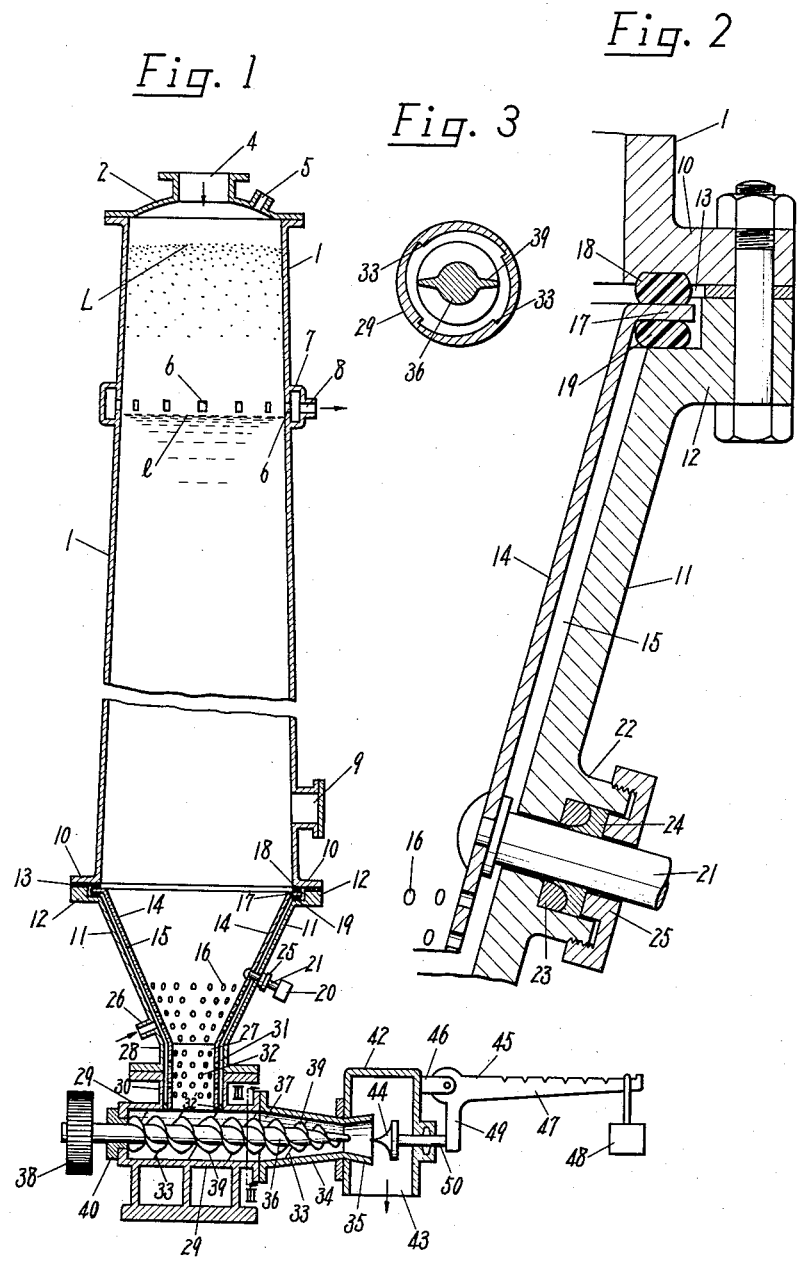

United States Patent Office 3,044,541
Patented July 17, 1962

3,044,541
CONTINUOUS DIGESTING AND EXTRACTING APPARATUS
Masao Sugasawa, 46 4-chome Okusawa-machi, Otaru, Japan
Filed Feb. 29, 1960, Ser. No. 11,513
Claims priority, application Japan Sept. 26, 1959
5 Claims. (Cl. 162—237)

The present invention relates to an apparatus for continuously digesting vegetable raw material and extracting desired constituents in the material therefrom, and more particularly to an apparatus for hydrolyzing raw material, broad-leaved or herbaceous plants such as white birch, beech, grass bamboo, rice straw, wheat straw or the like, and continuously extracting lignine and other soluble constituents by digestion while obtaining the treated material in the form of dried solids.

One of the main objects of the present invention is to provide a digesting and extracting apparatus which is of simple and compact construction and extremely efficient.

Another object of the present invention is to provide a digesting and extracting apparatus which is adapted to effect desired digestion and extraction with high efficiency by utilizing vibrating action physically to accelerate chemical reactions with extreme effectiveness.

A further object of the present invention is to provide an apparatus adapted to effectively perform separation of material being treated from the extracting solution and to obtain the treated material in the form of compressed solids in a desired dried condition.

Other objects, features and advantages will be apparent from the following detailed description.

The present invention is intended to provide an apparatus comprising a downwardly divergent digesting and extracting column or column type digesting and extracting vessel through the top of which vegetable raw material as required is continuously fed and through the lower portion of which treating solution is continuously fed contrariwise to the flow of raw material descending through the column so as to effect desired digesting and extracting treatments, and in which the extracting solution is withdrawn from the upper portion of the column while the residues formed in the reactions are continuously withdrawn out of the column through the bottom portion thereof. The present invention has a characteristic feature that, for the purpose of remarkably accelerating the chemical treatment in a physical manner while imparting mobility to non-fluid substances by imparting or transmitting to the material to be treated electromagnetic vibration suitable for such digesting and extracting treatment, an electromagnetic vibrator is arranged at a proper location on the column, preferably on a funnel-shaped portion at the bottom thereof for transmitting vibration to the entire material to be processed, thereby to promote the extracting reaction to extremely effectively carry out the extracting process as required while the residues formed in the process are introduced smoothly into a screw press housing horizontally mounted at the bottom of the column by way of an inlet opening in said housing so as to compress and separate the extracting solution adsorbed in the treated material, the separated solution being caused to flow back into the column through the bottom thereof. Further, the present invention is characterized in that the steps of extruding the compressed material may be carried out most effectively while causing the said compressed material in a dried state to effect plugging action for maintaining airtightness in the apparatus, and the various operations including the above vibration transmission, the extracting reaction, the descending process of the material to be processed and the withdrawal or delivery of the treated material may be carried out continuously.

Furthermore, with the apparatus according to the present invention, the solid residues separated by extraction after digesting process can be obtained in the form of various semi-chemical or chemical pulps.

Various continuous digesting and extracting apparatuses have hithertofore been proposed but most of them are of the vertical type having a complicated construction comprising a large number of mechanical parts while some of them, which are of a horizontal type, are only adapted to continuously repeat a batch process. Specifically, with these conventional apparatuses, heat loss is great and the yield of extracting solution is low so that the entire apparatus is inefficient, due to the fact that a separating step is required to be effected after blow discharge in connection with the separation and discharge of the treated material and the extracting solution.

The present invention relies upon a novel conception entirely different from the principle upon which these conventional apparatuses operate and is intended for the provision of an efficient apparatus of simple and compact construction which is adapted to ingeniously utilize effects of mechanical vibration to accelerate physical and chemical reactions in the process with great effectiveness and which is also adapted to advantageously treat those residues formed in such process by a pressing operation while returning the separated extracting solution back into the column body.

The accompanying drawing illustrates one preferred embodiment of a continuous digesting and extracting apparatus of the present invention. In the drawing:

FIG. 1 is a fragmentary longitudinal cross-sectional view of an entire digesting and extracting apparatus according to the present invention;

FIG. 2 is an enlarged fragmentary cross-sectional view showing the mounting of a vibrating means for electromagnetically vibrating a false bottom vibrating wall forming the inner wall of the lower funnel-shaped vibratory section of the apparatus; and FIG. 3 is an enlarged transverse cross-sectional view substantially taken along the line III—III in FIG. 1.

The apparatus according to the present invention generally comprises a digesting and extracting column, a vibratory section having a vibrator attached thereto, and a separating section for compressing the treated material to separate the extracting solution therefrom which has been adsorbed in the material.

Referring to the drawing, reference numeral 1 designates the body of a downwardly slightly divergent digesting and extracting column having its top wall portion 2 provided with an inlet opening 4 through which raw material to be processed is fed and with a steam exhaust opening 5 adapted to be opened and closed. Provided in the upper portion of the column body is a plurality of discharging apertures 6 for the treating solution with a treated solution jacket 7 surrounding the apertures 6 and having an outlet opening 8 for the treating solution. Provided in the lower portion of the column body 1 is a peeping window 9. The said raw material inlet opening 4 may be provided with an airtight feeding means as required, while the treating solution outlet 8 may be provided with a blocking screen or other suitable means for preventing the treated material from flowing out. Reference numeral 10 designates a base flange of the column body 1 and 11 designates the outer wall of a funnel-shaped or inverted frusto-conical vibratory section at the bottom of the column, which section having at the top an end flange 12 tightly connected with said base flange 10 of the column body 1 by bolts and nuts or other suitable fastening means to form an annular recess 13 inside of said end flange 12. Reference numeral 14 indicates a false bottom vibrating wall forming the inner wall of the vibrating section and disposed concentrically with the outer wall 11 thereof to provide a funnel-shaped annular space 15 radially inwardly of the outer wall. The vibrating wall 14 also is formed with a great number of small perforations 16 in the lower portion thereof and has its top portion 17 outturned so as to be fitted into said annular recess 13 through the intermediary of an upper and a lower annular resilient pad 18 and 19 and firmly secured between said flanges 10 and 12 by the tightening of said fastening means. Secured to said inner wall or false bottom vibrating wall 14 of the funnel-shaped vibratory section through the outer wall 11 thereof is an electromagnetic vibrator 20, for example, of 7,000 cycles per minute, which has a vibration transmitting rod 21 secured at the inner extremity to said inner wall or false bottom vibrating wall 14. Extending outwardly from said outer wall 11 of the vibratory section is a cup-shaped projection 22 adapted to accommodate resilient members 23 and 24 of synthetic rubber with a cap 25 threaded over said cup-shaped projection 22. These members 22, 23, 24 and 25 in combination form a packing means. It will be seen that said vibration transmitting rod 21 extends through this packing means and is supported thereby. Provided on the outer wall 11 of the funnel-shaped vibratory section is an inlet port 26 for introducing treating solution which opens into the funnel-shaped space 15 defined between the inner and outer walls 14 and 11 of the vibratory section. It will be recognized that the treating solution introduced through said inlet port 26 into said space 15 flows uniformly into the interior of the bottom vibrating wall 14 by way of perforations 16 formed therein. Said inner bottom vibrating wall 14 has a lower extension 27 which extends inside and over the base portion 28 of the outer wall 11 of the funnel-shaped vibratory section and over a cylindrical throat 30 opening into the top portion of a horizontal tubular screw press housing 29 so as to define a cylindrical space 31 between them. The extension 27 also is provided with a great number of perforations 32. It will be observed that said funnel-shaped space 15 and said cylindrical space 31 are in communication with each other. Disposed in the lower portion of said cylindrical space 31 is a spacer 32' serving to maintain such space.

The separating section for separating the treated material from the extracting solution adsorbed therein is of a horizontal screw press type having a special construction as will be described later.

The above described horizontal tubular housing 29 has a number of helical grooves 33, for example four helical grooves, formed around the inner periphery thereof and has its forward portion 34 formed convergent to a point from where it flares outwardly to form a divergent delivery port 35. A screw shaft 36 is arranged rotatably in and longitudinally of a tubular chamber 37 defined by said screw press housing 29 so as to be driven by a driving gear 38 through a suitable power transmission (not shown). The shaft 36 also has secured to its outer periphery a feed screw or pressing screw 39. The feed screw 39 has a pitch decreasing progressively from the root portion of the shaft to its free extremity with the outer diameter as well as the inner or bottom diameter of the screw thread also decreasing with the pitch, the feed screw terminating at a point adjacent to the extremity of the forward portion 34. Reference numeral 40 designates a blocking member and a supporting base at rear end of said screw press housing 29. Further, the convergent portion of the housing 29 is connected at the forward end to an intermediate receptacle 42, having at the bottom a discharge opening 43, so as to be supported by one side wall of the receptacle and open into the interior thereof. Disposed on the receptacle opposite to said delivery port 35 is an adjusting valve 44, the pressure of which is adjustable with a weight 48 carried by one arm 47 of a bell crank lever 45 pivotally attached to the opposite side wall of said intermediate receptacle 42 by means of a bracket 46 secured thereto. The other arm 49 of the bell crank lever 45 is connected with said adjusting valve 44 through the intermediary of an operating rod 50. Solid or dried residues formed in the treatment, being extruded through the delivery port 35 in the form of dried compressed solids against the pressure of said adjusting valve 44 applied onto the residues to be extruded, is continuously delivered in the form of a stick or bar of an adjusted density.

Description will now be made with reference to the accompanying drawing on the pre-treatment for extracting from raw material such as birch or beech wood pentosan contained in the material as a pentose solution of high concentration and on the stage of processing residues formed in such pre-treatment of raw material, in accordance with the process in the present invention.

First, operation of plugging the exit or discharging port of the treated material will be explained. This operation comprises feeding a proper amount of said raw material in the form of chips previously subjected to a suitable softening treatment through the inlet 4 opening into the top portion of the digesting and extracting column 1, and subsequently supplying an electric power to the electromagnetic vibrator 20 for causing vibration of the said vibrator and thereby imparting vibration of the order of, say, about 7,000 cycles per minute to the inner wall or false bottom vibrating wall 14 of the vibratory section, through the vibration transmitting rod 21 and the packing means 22-25. Then, a corresponding pressure is applied onto the adjusting valve 44 through the arm 47 of the bell crank lever 45 and the operating rod 50 by locating the weight 48 in an appropriate position. Thereafter, rotation of the screw shaft 36 by means of a power transmitting coupling, not shown, causes chips treated in the column body 1 to be sent progressively forward by the cooperation of the feed screw 3 and the helical grooves 33 into the convergent portion 34 of the separating section where the treated chips are compressed to form a resilient plug while being pushed toward the divergent delivery port 35. The material is delivered through the port 35 against the adjusted pressure of the adjusting valve 44 into the intermediate receptacle 42 and thence discharged through the discharge opening 43 thereof as a treated material. When such discharge is observed, the rotation of the screw shaft 36 is temporarily stopped as it indicates that the process of airtight plugging has completed in the zone of the treated material discharge opening 43. Then, a treating solution, for example comprising a dilute sulfuric acid solution of 0.7% concentration and heated to a temperature from 100° C. to 105° C., is introduced in predetermined quantities through the inlet port 26 into the bottom of the column 1 while raw material in the form of properly prepared chips is continuously fed through the feed opening 4 by a suitable metering feed means. On this occasion, the feed ratio of the raw material in the form of chips to the treating solution is preferably of the order of 1.5:1 to 3:1 by weight. Thus, as the feed of chips and solution continues, the surface $l$ of the solution in the column progressively rises while maintaining the top surface of raw material charged in the column at the same level as that of the solution therein, until the solution commences to overflow through the discharge opening 6 provided in the top portion of the column, such solution is recovered as a concentrated extracting solution through the treating solution outlet 8 on the jacket 7. Chips are continuously fed and, when the top of the mass of chips in the column reaches a level L about one meter higher than the level $l$ of the solution, the screw shaft 36 is started to rotate to compress the treated material in the screw press housing 29, and discharge the treated material therefrom, while separating the extracting solution from such material. On this occasion, the extracting solution, being squeezed out, is caused to flow back to the bottom portion of the extracting column 1 by the action of the helical grooves 33 formed around the inner wall of the screw press housing 29 and join with the treating solution in the column bottom, after which the mixed solution is caused to flow contrariwise to the raw material. Such arrangement that the top of the mass of chips in the column is maintained at a level L about one meter higher than that l of the solution is for the purpose of causing the chips to be subjected to digesting treatment during the passage through the vertical distance of about one meter as well as of accelerating the descent of chips through the treating solution by gravitation. Further, control of the period of time of digestion and extraction, that is, of contacting passage, may be effected by controlling the amount of feed per hour.

By the operation as described above, the apparatus according to the present invention can function effectively. In other words, in such operation, the raw material and the treating solution flow contrariwise or in opposite vertical directions and, during digestion and extraction, the material to be treated is continuously subjected to the optimum vibration, whereby the intended treating effect is remarkably accelerated. Further, with the inventive apparatus, both the concentrated extracting solution and the residues in the form of dried solids can be treated efficiently and economically.

As it will be apparent from the following table which shows a comparison of results obtained by such operation of the apparatus of the present invention with results obtained with conventional apparatuses of the kind, the present apparatus gives extraordinarily excellent results:

|  | Conventional Batch Type | Conventional Continuous Type | Continuous Apparatus of the Invention |
| --- | --- | --- | --- |
| Amount of raw material treated | 1.0 ton | 1.0 ton | 1.0 ton. |
| Time required for treatment | 4.5 hrs | 3 hrs | 2 hrs. 17 min. |
| Concentration of extracted pentose solution | 10.2% | 12.5% | 25%. |
| Yield of extracted reduced sugars | 176 kg | 218 kg | 260 kg. |
| Water contents of treated residues | 60% | 62% | 20%. |
| Steam consumption | 550 kg | 750 kg | 280 kg. |
| Extraction rate of pentosan | 68% | 80% | 90%. |
| Solution ratio (by weight) | 3:1 | 2.5:1 | 1.5:1. |
| Yield of residues, percent | 74 | 74.5% | 73%. |
| Treating conditions | $H_2SO_4$ 3%, 105° C., 3 hrs. | $H_2SO_4$ 3%, 105° C., 3 hrs. | $H_2SO_4$ 2%, 106° C., 2 hrs. |

The digesting and extracting apparatus according to the invention is capable of meeting completely the requirements for a chemical industrial apparatus intended for the utilization to a high degree of various wood materials.

In other words, in treating the material, for example in producing a variety of chemical pulps from vegetable materials obtained for example from appropriate broad-leaved and herbaceous plants and the like, the apparatus of the present invention may function with utmost effectiveness, particularly when used for obtaining high grade pulps or saccharified substances through a pre-treatment by which pentosan contained in the material is obtained in the form of a pentose solution of high concentration (or further as furfural).

Previous methods and apparatuses heretofore suggested for the treatment of the kind described not only involve a complicated construction but also have failed to obtain an extracting solution of high concentration as required, and which has necessitated an extraordinarily uneconomical process to obtain a final product from the extract. In contrast therewith, in treatment with the present apparatus, reduced sugar can be extracted as a solution of a high concentration of 25% or more and also not less than 95% of the effective constituent be extracted so that such extract may be advantageously utilized for any of various objects, for example, it may be decomposed into furfural, be concentrated to form xylose crystals, or fermented to obtain sodium glutamate.

Furthermore, with respect to the preparation of the treated material, in the conventional apparatus, such material has been withdrawn together with a large amount of extracting solution adsorbed therein, and therefore, necessitates various steps for separation of the solution such as scrubbing, leaching, liquid separation or drying, whereas the adsorbed extracting solution in the apparatus of the present invention can be separated while being compressed in the screw press housing at the bottom of the digesting and extracting column so that the rate of liquid separation is extremely high with low power consumption and that the treated material is obtained as crude pulp in the form of dried solids which permits the fibers contained in such material to be very conveniently made use of.

Further, the apparatus according to the present invention may be utilized satisfactorily for various digesting, extracting and separating processes including not only the above described extracting process but also continuous digesting in the manufacture of chemical pulps, continuous saccharification of fibrous materials, continuous extraction of sugar solution from sugar containing substances and continuous extraction of furfural.

In addition, by use of the apparatus of the present invention, pulp for fiber boards may be obtained from grass bamboo as raw material by subjecting it to the pre-treatment comprising a digesting process. On this occasion, from one ton (dry weight) of raw material used in the pre-treatment is obtained about one ton of a 25% solution of reduced sugar and approximately 725 kilograms of crude pulp. The pre-treated material thus obtained may be washed and regulated by the neutralization with a weak alkaline solution having pH of about 7.2 to 7.5. The regulated material is then fed to a pulp defibrator to be defibrated into individual fibers which form a pulp adapted to provide most excellent fiber boards.

The method of manufacturing such fiber boards may be applied any of well known wet processes. The qualities of fiber boards thus obtained are illustrated as follows:

| | |
| --- | --- |
| Wet matt | Water content, 70%; thickness, 15 mm. |
| Press condition | Clamping pressure, 15 kg./cm.$^2$; 160° C.; 10 minutes. |
| Specific gravity | 0.98. |
| Bending strength | 650 kg./cm.$^2$. |
| Rate of water absorption | 18% (immersed in water for 24 hours). |

Further, by digestion and extraction with the apparatus of the invention, rayon pulp may also be obtained. In this case, the treating solution used is a 3% solution comprising a mixture of 4 parts of caustic soda and one part of sodium sulfide, and the raw material chips are continuously treated so that they may be digested for three hours at the temperature of 165° C. with the feed ratio of the material chips and the treating solution of 3:1. On this occasion, the waste liquor indicates a concentration of 18° to 20° Bé., so that it is possible to minimize the heat required for concentration of the liquor in the process of recovering, chemical agents therefrom.

Further, in this case, the pulp, having passed through the screw press housing at the column bottom during such continuous digesting process and discharged through the discharge port of the intermediate receptacle, is already substantially separated from liquid so as to have a liquid content of the order of 20% so that subsequent washing operation is easy. The pulp thus obtained is passed through well known washing and bleaching stages and is formed into dry pulp sheets.

The pulp, being a high grade pulp having 96.5% α-cellulose, can be obtained from the raw material at a yield of 36%, that is, 360 kilograms of such pulp is obtained from one ton of the material chips. In addition, pentosane has substantially completely been removed in the pre-treatment so that the agent for removing lignine may be used satisfactorily in an amount of only approximately 20% of the raw material. This is substantially low in comparison with the amount of the lignine removing agent of 25% to 26% required in the conventional methods.

What I claim is:

1. A continuous digesting and extracting apparatus which comprises a vertically disposed digesting and extracting column having a top and base, a feed opening defined in the top wall of said column for supplying the material to be treated, a discharge opening defined in the top of said column and adapted to be opened and closed; an aperture for discharging the treating solution defined in the upper portion of said column, a funnel-shaped vibratory section composed of an outer wall attached to the base of said column, the wide end of which is concentrically connected with the base of the column and an inner funnel-shaped porous wall forming a false bottom vibrating wall within said section, a funnel-shaped annular space being defined between said outer wall and the inner vibrating wall inside the vibratory section, an electromagnetic vibrator attached to the vibratory section and having a vibration transmitting rod affixed to said inner wall, an inlet port for the treating solution, defined in the outer wall of said funnel-shaped vibratory section communicating with said annular space, a horizontal tubular screw press housing having helical grooves around the inner periphery and arranged to communicate through an inlet with the bottom of the vibratory section, a screw shaft rotatably mounted in said housing extending longitudinally thereof and a feed screw secured to the outer periphery of said screw shaft feeding in an opposite direction than said helical grooves, said screw press housing having a forward portion comprising a forwardly convergent subportion and a forwardly divergent delivery port, said feed screw feeding toward said port and said helical grooves feeding toward said press housing inlet.

2. A continuous digesting and extracting apparatus which comprises a downwardly divergent digesting and extracting column having a top and base, a feed opening defined in the top wall of said column for supplying the material to be treated, a discharge opening defined in the top wall of said column and adapted to be opened and closed, a plurality of apertures for discharging the treating solution defined circumferentially in the upper portion of said column, a jacket for receiving the treating solution disposed about the said discharge apertures and having a delivery port for the treating solution, a funnel-shaped vibratory section having an outer wall, the wide end of which is concentrically connected with the base of the column body and including an inner funnel-shaped porous wall forming a false bottom vibrating wall, an annular funnel-shaped space being defined between the outer wall and the inner vibrating wall inside the vibratory section, an electromagnetic vibrator attached to the vibratory section and having a vibration transmitting rod, the inner extremity of which extends through a packing means and is secured to said inner vibrating wall so that the latter may be freely vibrated, an inlet port for the treating solution, defined in the outer wall of said funnel-shaped vibratory section in communication with said annular space, a horizontal tubular screw press housing having helical grooves around the inner periphery and arranged to communicate with the vibratory section at the bottom thereof through an inlet, a screw shaft rotatably mounted in said housing extending longitudinally thereof, a feed screw secured to the outer periphery of said screw shaft, said screw press housing having a forward portion comprising a forwardly convergent subportion and a forwardly divergent delivery port, and an adjustable resistance valve operatively associated with said divergent delivery port, said feed screw feeding toward said port and helical grooves feeding toward said press housing inlet.

3. A continuous digesting and extracting apparatus as set forth in claim 2 in which the said column has a base flange at the base which is connected with an end flange defined at the top of the outer wall of the funnel-shaped vibratory section such that an annular recess is formed inside of said end flange, said recess adapted to accommodate upper and lower annular resilient pads between which is interposed and tightly secured an outturned top portion defined on said false bottom vibrating wall, and a plurality of small apertures defined on said inner wall.

4. A continuous digesting and extracting apparatus as set forth in claim 2, in which the pitch of said feed screw progressively decreases toward the extremity of the shaft adjacent said divergent delivery port.

5. A continuous digesting and extracting apparatus comprising, in combination, a vertically disposed container column having top and base portions, a material introducing inlet and a gaseous exhaust port defined in said top portion, a treating fluid discharge defined in said container column intermediate said top and base portions, a treating fluid inlet, vibrating and column discharge section affixed to the base portion of said column, said section including a resiliently mounted porous funnel-shaped inner wall having wide and narrow ends, said wide end being located adjacent said column base portion whereby the longitudinal axes of the inner wall and column substantially coincide, means vibrating said inner wall, a treating fluid inlet defined in said section, a material discharge port defined in said section in communication with said inner wall narrow end and means controlling the material flow through said discharge port.

References Cited in the file of this patent
UNITED STATES PATENTS

| | | |
|---|---|---|
| 2,089,992 | Campbell | Aug. 17, 1937 |
| 2,723,194 | Birdseye | Nov. 8, 1955 |

FOREIGN PATENTS

| | | |
|---|---|---|
| 491,379 | Italy | Mar. 4, 1954 |